(12) United States Patent
Zheng et al.

(10) Patent No.: US 11,650,950 B2
(45) Date of Patent: May 16, 2023

(54) CONTROL SYSTEM, SWITCH, AND METHOD FOR CONTROLLING EXECUTION DEVICE

(71) Applicant: INSPUR SUZHOU INTELLIGENT TECHNOLOGY CO., LTD., Jiangsu (CN)

(72) Inventors: Guanru Zheng, Jiangsu (CN); Kaiyong Jiang, Jiangsu (CN); Guangying Xue, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/760,838

(22) PCT Filed: Nov. 27, 2019

(86) PCT No.: PCT/CN2019/121098
§ 371 (c)(1),
(2) Date: Mar. 16, 2022

(87) PCT Pub. No.: WO2021/068374
PCT Pub. Date: Apr. 15, 2021

(65) Prior Publication Data
US 2022/0350772 A1 Nov. 3, 2022

(30) Foreign Application Priority Data
Oct. 10, 2019 (CN) .......................... 201910956928.X

(51) Int. Cl.
*G06F 13/42* (2006.01)
(52) U.S. Cl.
CPC .. *G06F 13/4221* (2013.01); *G06F 2213/0026* (2013.01)

(58) Field of Classification Search
CPC ................ G06F 13/4221; G06F 2213/0026
See application file for complete search history.

(56) References Cited

U.S. PATENT DOCUMENTS

| 5,201,029 A | 4/1993 | Jackson |
| 5,285,524 A | 2/1994 | Cok |

(Continued)

FOREIGN PATENT DOCUMENTS

| CN | 1731370 A | 2/2006 |
| CN | 101082896 A | 12/2007 |

(Continued)

OTHER PUBLICATIONS

First Office Action and English Translation cited in CN201910956928.X, dated Jun. 3, 2020, 17 pages.

(Continued)

*Primary Examiner* — Glenn A. Auve
(74) *Attorney, Agent, or Firm* — Cooper Legal Group, LLC

(57) ABSTRACT

A control system, a switch, and a method for controlling an execution device. The control system comprises a processor, a control module, and address resolution modules. The processor is connected to the control module by means of a peripheral component interconnection high-speed PCIe bus, the control module is connected to one or more address resolution modules by means of address buses, and each address resolution module is configured to be connected to one execution device, wherein address information of a port to be controlled on each execution device is preconfigured on the processor, and the address information is used for enabling the processor to address to a corresponding address resolution module by means of the control module. According to the control system, the number of occupied pins of the control module can be reduced, a specially developed driv- (Continued)

ing program is not needed, the control logic is simple, and the operation is stable.

16 Claims, 2 Drawing Sheets

(56) References Cited

U.S. PATENT DOCUMENTS

| | | | |
|---|---|---|---|
| 5,621,863 | A | 4/1997 | Boulet et al. |
| 5,649,069 | A | 7/1997 | Gobert |
| 10,055,376 | B1 | 8/2018 | Newkirk |
| 2015/0263994 | A1 | 9/2015 | Haramaty et al. |
| 2018/0357187 | A1* | 12/2018 | Loewen ............ H04L 12/40169 |

FOREIGN PATENT DOCUMENTS

| | | |
|---|---|---|
| CN | 102752050 A | 10/2012 |
| CN | 102855503 A | 1/2013 |
| CN | 102981992 A | 3/2013 |
| CN | 103188173 A | 7/2013 |
| CN | 105260335 A | 1/2016 |
| CN | 106168934 A | 11/2016 |
| CN | 109062851 A | 12/2018 |
| CN | 109446154 A | 3/2019 |
| CN | 109739794 A | 5/2019 |
| EP | 0378115 A2 | 7/1990 |
| WO | 2002080095 A2 | 10/2002 |
| WO | 2002080095 A3 | 1/2004 |

OTHER PUBLICATIONS

Second Office Action and English Translation cited in CN201910956928.X, dated Jan. 22, 2021, 25 pages.
Third Office Action and English Translation cited in CN201910956928.X, dated Jul. 26, 2021, 23 pages.
International Search Report and English Translation cited in PCT/CN2019/121098, dated May 29, 2020, 8 pages.

* cited by examiner

CONTROL SYSTEM, SWITCH, AND METHOD FOR CONTROLLING EXECUTION DEVICE

CROSS-REFERENCE TO RELATED APPLICATIONS

The present application claims priority to the Chinese patent application No. 201910956928.X filed with the Chinese Patent Office on Oct. 10, 2019, entitled "Control System, Switch, and Method for Controlling Execution Device", the entire contents of which are incorporated herein by reference.

TECHNICAL FIELD

The present application relates to control technologies and, in particular, to a control system, a switch, and a method for controlling an execution device.

BACKGROUND ART

Over the past decade, the cloud data center has experienced rapid development. Business-on-Cloud has reached a consensus from the government to the enterprise. In this context, the cloud data center is increasingly demanding for the requirements of network quality. These requirements are mainly reflected in network bandwidth, network delay, and storage capacity. For data center operators, the major means to obtain greater network bandwidth is to increase the number of ports and bandwidth density on the switch; that is, to control more optical modules in the switch; the means to enhance the storage capacity is to increase the number of hard disks in the storage server. With the increasing number of optical modules or hard disks, a backplane of a facility including these optical modules or hard disks has an increasing design difficulty accordingly. In particular, for the optical module control signals on the switch ports, generally speaking, each port of the switch would have at least 3 to 4 low-speed control signals, so there are at least 200 control signals for the optical modules on a single backplane.

The existing method for controlling the operation of the switch is that a processor sends an instruction to a Field-Programmable Gate Array (FPGA) via a Peripheral Component Interconnect express (PCIe) bus, and the FPGA directly controls each port of an optical module. This method occupies many FPGA pins, and wire leads occupy a large on-board space. Another method for controlling the operation of a switch is that a processor will send an instruction to a control module via a PCIe bus, and the control module is connected with a plurality of IO expansion modules via an I2C bus, and each IO expansion module controls an optical module. This method has a complex control logic, and needs to be integrated into a driver specially developed for a hardware architecture of the IO expansion module. Therefore, the method has a great development difficulty and has low efficiency, and is prone to abnormalities.

SUMMARY OF THE INVENTION

To solve the above technical problems, the present application provides an optical module control system, an implementation method and implementation device thereof, and a switch. It can reduce the number of occupied pins of the control module, and requires no specially developed driver, and has a simple control logic and stable operation.

In order to achieve the above objectives, an embodiment of the present application provides a control system for controlling an execution device, characterized in that the control system includes a processor, a control module, and an address resolution module; wherein,
the processor is connected to the control module by a Peripheral Component Interconnect express (PCIe) bus; the control module is connected to one or more address resolution modules by address buses, and each of the address resolution modules is configured to be connected to an execution device; wherein,
the processor is preconfigured with an address information of the port to be controlled on each execution device, and the address information is used for enabling the processor to address a corresponding address resolution module by the control module.

In an alternative embodiment, the processor is configured to send a control instruction to the control module; wherein, the control instruction contains an address information and a control action information of the port to be controlled of the execution device;
the control module is configured to address to a corresponding address resolution module according to the address information of the port to be controlled of the execution device contained in the control instruction;
the address resolution module is configured to send a control signal to the port to be controlled of a corresponding execution device according to the control action information in the control instruction.

In an alternative embodiment, the address resolution module includes an address resolver and a flip-flop having a latching function, and the address resolver is connected to the flip-flop in a one-to-one correspondence; the flip-flop is configured to be connected to an execution device, wherein,
the address resolver is configured to send control action information to the corresponding flip-flop when the address information in the control instruction matches the address of the execution device connected to the flip-flop;
the flip-flop is configured to execute a control action with respect to the corresponding execution device according to the control action information.

In an alternative embodiment, the control module is a Complex Programmable Logic Device (CPLD), a Microcontroller Unit (MCU) or a Field-Programmable Gate Array (FPGA).

In an alternative embodiment, the address resolution module is packaged with the corresponding execution device.

In an alternative embodiment, the control system includes a plurality of address resolution modules, and a daisy-chained topology is adopted for the address buses among the plurality of address resolution modules and the control module.

In an alternative embodiment, the plurality of address resolvers are packaged into a data selector, and the data selector is configured to resolve the address information.

In an alternative embodiment, the address resolver is a data selector, and an output of the address resolver is connected to a plurality of flip-flops.

In an alternative embodiment, the execution device is an optical module or a hard disk.

To achieve the above objectives, an embodiment of the present application provides a switch, including a control system in any of the above embodiments of the claims, and an execution device; wherein, the execution device is an optical module.

To achieve the above objectives, an embodiment of the present application provides a method for controlling an execution device; the method is executed by a control system, and the control system includes a processor, a control module and an address resolution module; the method includes the following steps:

sending a control instruction to the control module by the processor; wherein, the control instruction contains an address information and a control action information of the port to be controlled of the execution device;

addressing to a corresponding address resolution module by the control module according to the address information of the port to be controlled of the execution device contained in the control instruction;

sending a control signal to the port to be controlled of a corresponding execution device by the address resolution module according to the control action information in the control instruction. The embodiments of the present application have the following beneficial effects: the control system provided by the embodiments of the present application adopts the address bus to connect the control module and the address resolution module, so that the use of pins of the control module can be reduced, the control module with fewer pins can be selected to use, the size of the control module is reduced, the footprint of the backplane is further reduced, the model selection range of the control module is enriched, and the cost of the control module is reduced; the bus is adopted to connect each address resolution module, so that the position selection and wiring of the address resolution modules on the backplane of the switch can be more flexible, the size of the backplane of the switch is reduced on the whole, and even the number of layers of the backplane of the switch is reduced, and the manufacturing cost is further reduced; the control module addresses to the port of the execution device by adopting the index address allocated to the port to be controlled of the execution device, does not need to specially develop an adaptive driving program because of a hardware architecture, and is generally suitable for various collocations of the control system and the execution device, so that the driving program of the control system has simple and reliable logic, stable operation and difficult failure.

Other features and advantages of the present application will be described in the following description, and partly become obvious from the description, or understood by implementing the present application. The purpose and other advantages of the present application can be realized and obtained through the structures specifically pointed out in the written description, claims, and drawings.

BRIEF DESCRIPTION OF THE DRAWINGS

The accompanying drawings are included to provide a further understanding of the invention, and are incorporated in and constitute a part of this specification, illustrate embodiments of the invention and together with the example serve to explain the principles of the invention.

DETAILED DESCRIPTION OF THE INVENTION

To make the objects, technical solutions, and advantages of the present application more apparent, embodiments of the present application will be described in detail below with reference to the accompanying drawings. It should be noted that the embodiments and features of the embodiments in the present application may be arbitrarily combined with each other without conflict.

The steps illustrated in the flow charts of the drawings may be performed in a computer system such as in a set of computer-executable instructions. Also, while a logical order is shown in the flow diagrams, in some cases, the steps shown or described may be performed in an order different than here.

Figure 1:
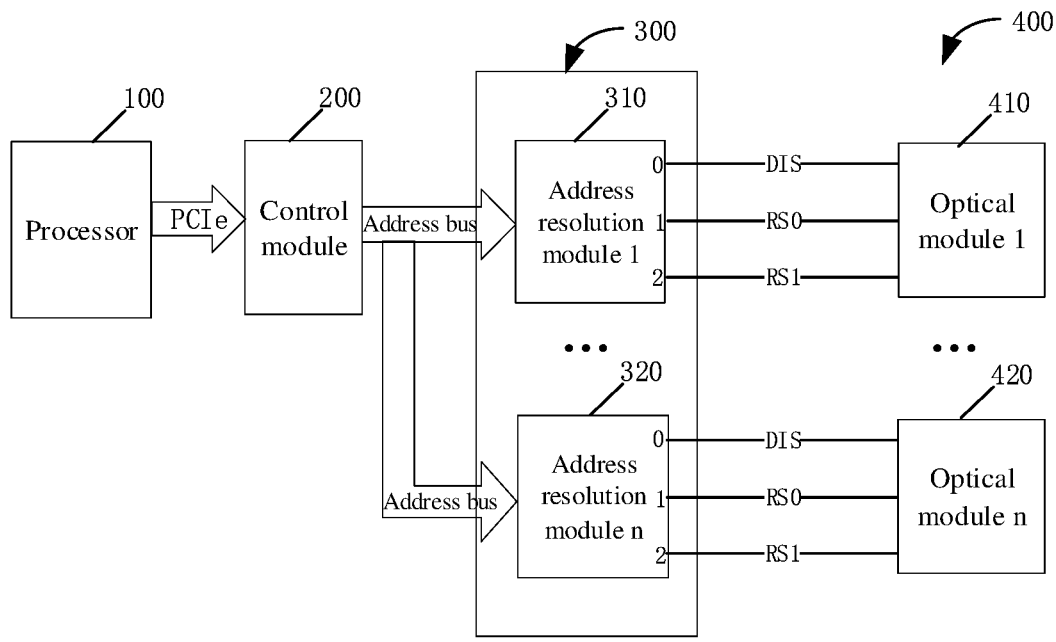
FIG. 1 is a block diagram showing an optical module control system provided in an embodiment of the present application.

To solve the above technical problem, an embodiment of the present application provides a control system to control an execution device. As shown in FIG. 1, the control system includes a processor 100, a control module 200, and an address resolution module 300. FIG. 1 further shows an execution device 400 connected to the address resolution modules 300.

The processor 100 is connected to the control module 200 by a PCIe bus, and the control module 200 is connected to one or more address resolution modules 300 by address buses, and each address resolution module 300 is connected to the execution device 400 by a wire lead.

The processor 100 is preconfigured with an address information of the port to be controlled on each execution device 400, and the address information is used for enabling the processor 100 to address a corresponding address resolution module 300 by the control module.

To control the execution of the execution device, the existing solution generally adopts the following two architectures: namely, a Field-Programmable Gate Array (FPGA)-based architecture and an Input/Output (IO) expansion module-based architecture. For the design of the FPGA-based architecture, the processor sends an instruction to FPGA via a Peripheral Component Interconnect express (PCIe) bus, and the FPGA directly controls each port of the optical module after resolving the instruction. The advantage thereof lies in that the execution device is directly controlled by the FPGA, which is more convenient to implement in terms of the driver program. In addition, since the execution device is directly connected, the architecture is relatively simple and straightforward. The disadvantage thereof lies in that the wire lead of all the execution devices need to occupy one pin of the FPGA, such that all wire leads occupy a large amount of on-board space, which causes great wastes both for the FPGA resources itself and for the on-board space. With regard to the IO extension module-based architecture, all the control signals of an execution device are connected to respective IO extension modules, and then all the IO extension modules are connected to a control module by an I2C bus. When the control system needs to control the execution device, the processor will issue an instruction to the control module by a PCIe bus, and then after resolving the instruction, the control module will convert the instruction into an I2C instruction and issue the I2C instruction to a corresponding IO extension module, thereby achieving control of the execution device. The advantage thereof lies in that the increase in the IO expansion modules lowers the requirement for the number of pins of the control module; and the 10 expansion modules may be placed in close proximity. Control signals of the execution device may achieve wire leading without straddling a long distance, thereby saving a lot of on-board space. However, the disadvantage thereof lies in that the control logic is complex, and it needs to be integrated into a driver specially developed for the hardware architecture of an IO expansion module. Therefore, the development is difficult and inefficient, and abnormalities are prone to occur.

Compared with the above two traditional methods, in the technical solutions provided by the above embodiments of the present application, the control module 200 is connected to one or more address resolution modules 300 via address buses. The control module 200 can be connected to the address buses by a small number of pins, and control a large number of address resolution modules 300. Therefore, compared with the solution based on the FPGA architecture, when a larger number of address resolution modules 300 need to be controlled, a smaller number of pins of the control module 200 can be occupied. In addition, in this technical solution, the preconfigured address information of the port to be controlled is used to address to the address resolution modules 300, so as to control the execution device 400 corresponding to the addressed address resolution module 300. Therefore, in the technical solutions provided by the embodiments of the present application, there is no need to develop a special driver program for the hardware architecture of the control system. Therefore, when constructing the control system and controlling the execution device, the solution of addressing the address resolution module 300 with preset port address information is generally applicable to various combinations of the control system and the execution device 400. Therefore, the workload of developing the driver program can be reduced, and the efficiency of creating the control system and running the control system and the execution device is high. In addition, because the solution is generally applicable to various combinations of the control system and the execution device 400, the driver program of the control system is stable and less likely to fail.

In an alternative embodiment, the processor 100 is configured to send a control instruction to the control module; wherein, the control instruction contains an address information and a control action information of the port to be controlled of the execution device;

the control module 200 is configured to address to a corresponding address resolution module according to the address information of the port to be controlled of the execution device contained in the control instruction;

the address resolution module 300 is configured to send a control signal to the port to be controlled of a corresponding execution device according to control action information in the control instruction.

In the above alternative embodiments, the processor 100 sends a control instruction to the control module 200 via the PCIe bus. When controlling a certain port to be controlled of the execution device 400, the processor 100 is configured to send a control instruction to the control module 200 after inquiring an address pre-allocated for the port to be controlled of the execution device so as to control a certain execution device (410, 420, etc.) in the control system. The address pre-allocated for the port to be controlled of the execution device is stored in a memory of the control system; and the memory of the control system saves an index address allocated for the execution device when the port to be controlled of the execution device is set initially. The memory receives an access sent by the processor 100, and returns the inquired index address of the port to be controlled of the execution device to the processor 100 after inquiring the index address of the port to be controlled of the execution device.

The control module 200 resolves out the address information and the control action information of the port to be controlled of the execution device from the control instruction after receiving the control instruction sent by the processor 100 through the PCIe bus. The address information refers to an index address of an execution device of a control system in the memory; and the control action information represents that the flip-flop 303 connected to the execution device 400 is flip-flopped or de-flip-flopped, thus controlling the operation and stop of the execution device 400.

The address resolution module 300 is configured to index the port of the execution device 400 corresponding to the address information according to the address information acquired from the control module 200 via the address bus, and execute a control action on the execution device 400 corresponding to the address information according to the control action information acquired from the control module 200 via the address bus.

Here, to effectively reduce the wiring demanded for the control of the execution device and the space occupied by the control module (chip) 200, in the embodiments of the present application, the control action information of the processor 100 is indexed to an execution device 400 which needs to execute a control instruction by using an index address inquired in the memory. To achieve the above objective, the control module 200 is configured to resolve out an address information and a control action information from the control instruction of the processor 100; and then the resolved-out address information and control action information are transmitted to the address resolution module 300 by the address bus; and the address resolution module 300 indexes the control action information to the execution device 400 which needs to execute the control instruction according to the address information. Since an address mapping mode is taken in the control system provided in the embodiments of the present application, the execution device 400 can be indexed only through an address bus. Compared with the design of the existing FPGA-based architecture, the number of wire leads used is reduced, and accordingly, the space occupied by the arrangement of wire leads and the number of pins occupied are reduced as well. Therefore, in case of controlling the same number of execution devices 400, compared with the design of the FPGA-based architecture, the control module 200 may use a smaller number of pins in the control system provided in the embodiments of the present application, and the control module 200 has a larger model selection range, and a device with fewer pins may be used as the control module 200 in the control system provided in the embodiments of the present application. Therefore, the cost of the control module 200 may be reduced correspondingly. On the other hand, the control module 200 may be selected from other types of control modules 200 instead of a FPGA only; these control modules 200 may occupy less space than the FPGA, thus reducing the space occupied by the control module 200 on the backplane. For the design of the JO-based expansion module, using a large number of devices supporting I2C communication protocol will cause logical complexity, because all the devices supporting I2C communication protocol are based on the I2C bus protocol; and different I2C bus protocols must be integrated within the controller directed to different architectures (for example, in different architectures, if the addresses of the devices supporting the I2C communication protocol are different, codes need to be remodified, thus leading to development costs). Compared with the design of the JO-based expansion module in the prior art, the hardware used in the solution provided by the embodiments of the present application is decoupled to the logic of a program loaded. Compared with the design based on the IO expansion module in the prior art, the hardware used in the solution provided by the embodiments of the present application is decoupled from the logic of the loaded program. Therefore, the developer of the program does not need to develop according to the actual hardware architecture, but only needs to start the development of the software according to the address table of the control pins on a set of hardware devices. At the same time, the hardware also performs hardware adaptation according to this address table, which greatly improves the development efficiency of the driver. The control system provided by the embodiments of the present application does not need to use an IO expansion module. Therefore, when executing the control instruction, there is no need for the IO expansion module to occupy the space on the backplane, the backplane can be made smaller in size, and even the number of layers of the printed circuit board used as the backplane can be reduced, thus reducing the cost of manufacturing the backplane. And because the control system adopts the address mapping method, there is no need to integrate the driver of the IO expansion module and use the driver of the expansion module to find the target execution device to execute the action, so the control logic is also easier to implement, and the execution of the control action is more stable.

Compared with the design of the FPGA-based architecture, in the control system provided by the embodiments of the present application, both the control module 200 and the address resolution module 300 are adopted to realize the functions of the FPGA. Compared to the design of the JO-based expansion module, both the control module 200 and the address resolution module 300 are adopted to realize the functions of the control module and the IO expansion module in the control system provided by the embodiments of the present application. The control module 200 is only configured for resolving the control instruction and thus, has a very wide selection range. In an alternative embodiment, the control module 200 may be a Complex Programmable Logic Device (CPLD), a Microcontroller Unit (MCU), a FPGA, or may be other smaller size of control devices as long as the control instruction sent by the processor 100 may be resolved. In an alternative embodiment, the address resolution module 300 may use an address resolver 302 and a flip-flop 303 having a latching function, thus indexing to an execution device corresponding to the control instruction; the address resolver 302 may be connected to the flip-flop 303 in a one-to-one correspondence, and the flip-flop 303 is configured to be connected to the execution device; wherein the address resolver 302 is used to determine the execution device (410, 420, etc.) indexed by the address information: sending a control action information to the corresponding flip-flop 303 when the address information in the control instruction matches the address of the execution device connected to the flip-flop 303; the flip-flop 303 is configured to execute a control action of an execution device corresponding to the flip-flop 303 according to the control action information. In an alternative embodiment, the flip-flop 303 may be a JK flip-flop or an RS flip-flop. The flip-flop 303 may be connected to a corresponding execution device by an output thereof. The actions of the JK flip-flop include: a hold state, a reset state, a set state and a state inversion. The JK flip-flop has only one output pin, which is connected to an input end of an execution device, thus controlling an input signal of the execution device via a change of level on the output pin of the JK flip-flop. The output signal of the JK flip-flop is a pulse mode, and each pulse will change the level of the output once, thereby achieving a switch between a high level and a low level. The actions of the RS flip-flop include: a hold state, a reset state, and a set state. Compared with the FPGA, the address resolution module 300 has a very small size, and even the address resolution module 300 can be integrated into a silicon chip-level package. Therefore, the size is much smaller than that of a large-scale programmable control devices, such as a FPGA. Based on the above feature of the small size of the address resolution module 300, the control module 200 is connected to the address resolution module 300 via an address bus in the control system provided with the embodiments of the present application. Therefore, the address resolution module 300 may be flexibly arranged close to the execution device 400. In an alternative embodiment, the address resolution module 300 may be packaged with a corresponding execution device 400, thereby further reducing the space occupied by the address resolution module 300 on the backplane alone. In an alternative embodiment, the address resolution module 300 is above the execution device 400. In an alternative embodiment, the address resolution module 300 is disposed on the backplane. In addition, the control module 200 is connected to the address resolution module 300 via an address bus in the embodiments of the present application. Therefore, not just like the existing technical solution, to connect the control module and the execution device (or connect the control module, the IO expansion module and the execution device in the design of the JO-based expansion module), firstly, all the wire leads are firstly collected at a control module, and then connected to the execution device after across more than half of the backplane (or in the design of the JO-based expansion module, all the wire leads connected to the IO expansion module are collected at a control module, and then led out from the IO expansion module and collected to each execution device). In such an arrangement, a large number of wire leads are also required to be connected across more than half of the backplane). However, in the embodiments of the present application, each address resolution module may be connected via an address bus. Moreover, since the address bus may carry a relatively large amount of information, only the address bus with few wire leads may meet the requirements. Thus, the address bus will not occupy a large amount of backplane space. For example, if there are 56 execution devices 400 in the control system, and each execution device 400 has 3 control signals, at this time, there are 168 control signals in total. If the design based on the FPGA architecture is adopted, at least 168 pins of the FPGA need to be occupied. Therefore, the specification requirements of the FPGA are very high, the size of the FPGA will be large, and the space of the backplane will be occupied substantially due to the wiring. However, in the solution of the embodiment of the present application, access to all control signals can be achieved by an 8-bit wide bus alone (a maximum of 28=256 addresses can be provided). At this time, only 8 pins of the control module are occupied to complete the control, so the screening range of the control module 200 is very large, and the control module 200 with small size and meeting the usage requirements can be selected as needed. Based on the above discussion, in the control system provided by the embodiments of the present application, compared with the technical solutions of the prior art, a very small control module 200 may be selected, and the address bus wiring is very concise. Therefore, a printed circuit board with a smaller number of layers may be selected as the backplane, which will reduce the cost of the printed circuit board. For example, a 14-layer printed circuit board costs 40% less than a 16-layer printed circuit board.

For the purpose of indexing the target execution device to a control instruction by means of an address mapping mode, in an alternative embodiment, the control system includes a plurality of address resolution modules (310, 320, etc.), and a daisy-chained topology is adopted for the address buses among the plurality of address resolution modules and the control module. Then, when the address information and the control action information are received via the address bus, the execution device corresponding to the address information is indexed via the daisy chain formed by the connection of each address resolution modules to each other. Specifically, input interfaces of all the address resolution modules are connected in series by the wiring on the printed circuit board, and all the address resolution modules are actually in a parallel relationship; when the control module sends an address information, all the address resolution modules basically receive the information at the same time; the address resolution module which may resolve out the paired address will send a flip-flop signal; and if the address resolved by the address resolution module is not the paired address, the address resolution module ignores the received address information and the control action information. In the technical solution of using an address resolver 302 and a JK flip-flop, the address resolver 302 with a paired address will trigger a rear-end JK flip-flop, and the level of the JK flip-flop is inverted, thereby completing the flip-flopping/de-flip-flopping of the controlled signal. In an alternative embodiment, the address resolver 302 may be a data selector 301, such as a One-of-Eight data selector with a model of Hitachi 74LS151; an output end of the address resolver 302 may be connected to a plurality of flip-flops 303. Alternatively, a plurality of address resolvers 302 connected in a daisy chain form may serve as an entirety which is set as a form of a data selector and has the functions of the data selector.

In an alternative embodiment, the processor 100 is selected to be a Xeon D-1527 processor from Intel Corporation, connected to a control module via a set of PCIe buses. The control module 200 is selected to be a LFE5U-12F-6MG285C processor from Lattice Corporate. The control module 200 is connected to an address resolver 302 via a set of address buses. The address resolver 302 may be a data selector 301. The data selector 301 is selected to be a One-of-Eight data selector with a model of Hitachi 74LS151. For the application of 48 execution devices, a total of 18 One-of-Eight data selectors are required, each path of downstream port on the data selector 301 is connected to a JK flip-flop; and the JK flip-flop is selected to be Hitachi 74LS76 model, and 72 JK flip-flops of this model are required in total. The data selector 301 and the JK flip-flop constitute an address resolution module 300, which is arranged close to the execution device 400, and a small package may be selected to achieve the purpose of saving space; the addressing bus output from the control module 200 is connected to the address resolution modules through a daisy chain.

The control system provided by embodiments of the present application may be widely used in a variety of fields. Thus, in an alternative embodiment, the execution device 400 is an optical module. When the execution device 400 is an optical module, an instruction is sent to the optical module via pins DIS, RS0, and RS1 of the optical module, thus controlling the action of the corresponding optical module. A signal sent by a flip-flop to an optical module via a DIS pin of the corresponding optical module is responsible for controlling whether the corresponding optical module works; signals introduced by the pins RS0 and RS1 are responsible for controlling the operating mode of the optical module and are used to switch the rate of the optical module. In an alternative embodiment, the execution device 400 is a hard disk, and the plurality of hard disks connected to the control system constitute a hard disk array, and the control system is used to control whether a hard disk in the hard disk array is running.

Figure 2:
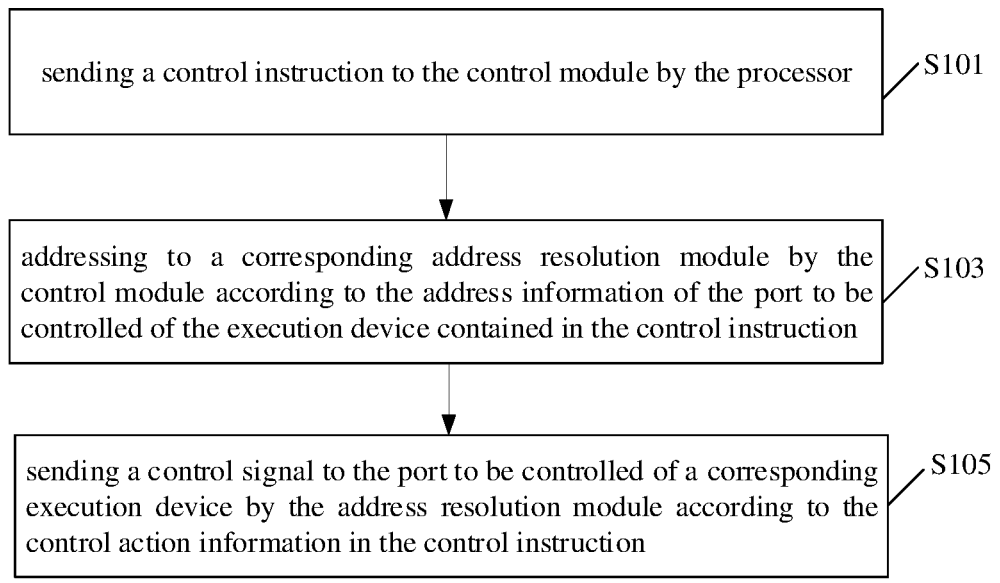
FIG. 2 is a flow diagram showing an implementation method of the optical module control system provided in an embodiment of the present application.
Figure 3:
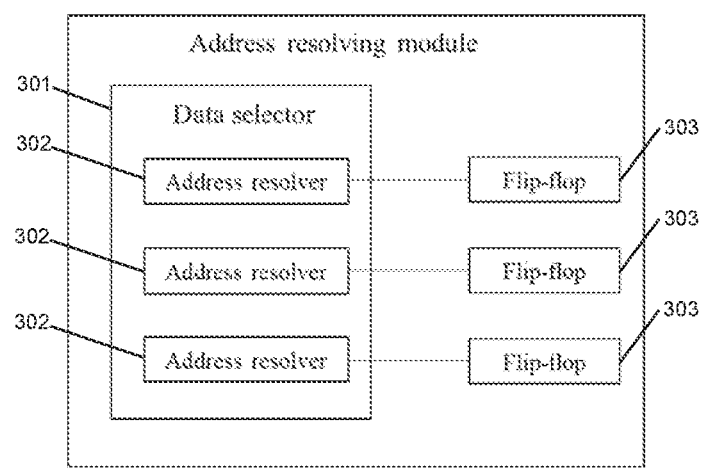
FIG. 3 is a schematic block diagram of an address resolving module.

An embodiment of the present application provides a method of controlling an execution device, the method is executed by a control system, and the control system includes a processor, a control module, and an address resolution module; as shown in FIG. 2, the method includes steps S101-S105:

Step S101, sending a control instruction to the control module by the processor.

Wherein the control instruction contains an address information and a control action information of the port to be controlled of the execution device.

Step S103, addressing to a corresponding address resolution module by the control module according to the address information of the port to be controlled of the execution device contained in the control instruction.

Step S105, sending a control signal to the port to be controlled of a corresponding execution device by the address resolution module according to the control action information in the control instruction.

Even though the embodiments disclosed herein are described above, the descriptions in the following are merely embodiments for the convenience of understanding the present application, but not constructed as limiting the present application. Any person skilled in the art may make any modifications and variations in the implementation form and details without departing from the spirit and scope of the present invention. Moreover, the protection scope of the present application shall still be subject to the scope defined in the claims in the appendix.

What is claimed is:

1. A control system for controlling execution devices, wherein the control system comprises a processor, a control module, and a plurality of address resolution modules; wherein, the processor is connected to the control module by a Peripheral Component Interconnect express (PCIe) bus; the control module is connected to one or more of the plurality of address resolution modules by address buses, and each of the plurality of address resolution modules is configured to be connected to one of the execution devices; wherein, the processor is preconfigured with address information of ports of each of the execution devices, and the address information is used for enabling the processor to address a corresponding address resolution module of the plurality of address resolution modules by the control module.

2. The control system according to claim 1, wherein, the processor is configured to send a control instruction to the control module; wherein, the control instruction contains the address information and control action information of the ports;

the control module is configured to address the corresponding address resolution module according to the address information of the ports contained in the control instruction;

each of the plurality of address resolution modules is configured to send a control signal to the ports of a corresponding execution device of the execution devices according to the control action information in the control instruction.

3. The control system according to claim 1, wherein each of the plurality of address resolution modules comprises a plurality of address resolvers and a plurality of flip-flops having a latching function, and the plurality of address resolvers are connected to the plurality of flip-flops in a one-to-one correspondence, and each of the plurality of flip-flops is configured to be connected to one of the execution devices, wherein, each of the plurality of address resolvers is configured to send control action information to a corresponding flip-flop of the plurality of flip-flops when the address information in a control instruction matches an address of a corresponding execution device of the execution devices connected to the corresponding flip-flop;

the corresponding flip-flop is configured to execute a control action with respect to the corresponding execution device according to the control action information.

4. The control system according to claim 3, wherein each of the plurality of address resolvers is a data selector, and output ends of the plurality of address resolvers are connected to the plurality of flip-flops.

5. The control system according to claim 1, wherein the control module is a Complex Programmable Logic Device (CPLD), a Microcontroller Unit (MCU), or a Field-Programmable Gate Array (FPGA).

6. The control system according to claim 1, wherein each of the plurality of address resolution modules is packaged with a corresponding execution device of the execution devices.

7. The control system according to claim 1, wherein the plurality of address resolution modules are packaged into a data selector, and the data selector is used for resolving the address information.

8. The control system according to claim 1, wherein the execution devices are optical modules or hard disks.

9. A switch, wherein the switch comprises the control system according to claim 1 and the execution devices; wherein the execution devices are optical modules.

10. The switch according to claim 9, wherein, the processor is configured to send a control instruction to the control module; wherein, the control instruction contains the address information and control action information of the ports;

the control module is configured to address the corresponding address resolution module according to the address information of the ports contained in the control instruction;

the corresponding address resolution module is configured to send a control signal to the ports of a corresponding execution device of the execution devices according to the control action information in the control instruction.

11. The switch according to claim 9, wherein each of the plurality of address resolution modules comprises a plurality of address resolvers and a plurality of flip-flops having a latching function, and the plurality of address resolvers are connected to the plurality of flip-flops in a one-to-one correspondence, and each of the plurality of flip-flops is configured to be connected to one of the execution devices, wherein, each of the plurality of address resolvers is configured to send control action information to a corresponding flip-flop of the plurality of flip-flops when the address information in a control instruction matches an address of a corresponding execution device of the execution devices connected to the corresponding flip-flop;

the corresponding flip-flop is configured to execute a control action with respect to the corresponding execution device according to the control action information.

12. The switch according to claim 11, wherein the plurality of address resolvers are packaged into a data selector, and the data selector is used for resolving the address information.

13. The switch according to claim 11, wherein each of the plurality of address resolvers is a data selector, and output ends of the plurality of address resolvers are connected to the plurality of flip-flops.

14. The switch according to claim 9, wherein the control module is a Complex Programmable Logic Device (CPLD), a Microcontroller Unit (MCU), or a Field-Programmable Gate Array (FPGA).

15. The switch according to claim 9, wherein each of the plurality of address resolution modules is packaged with a corresponding execution device of the execution devices.

16. A method for controlling execution devices, the method being executed by a control system, wherein the control system comprises a processor, a control module, and a plurality of address resolution modules; the method comprises the following steps:

sending a control instruction to the control module by the processor; wherein, the control instruction contains address information and control action information of ports of the execution devices;

addressing to a corresponding address resolution module of the plurality of address resolution modules by the control module according to the address information of the ports contained in the control instruction;

sending a control signal to the ports of a corresponding execution device of the execution devices by the corresponding address resolution module according to the control action information in the control instruction.

* * * * *